Aug. 8, 1933.  E. R. SNAVELY  1,921,708
COMBINED HOUSE HEATING AND DOMESTIC WATER HEATING SYSTEM
Filed Jan. 14, 1933  2 Sheets-Sheet 1
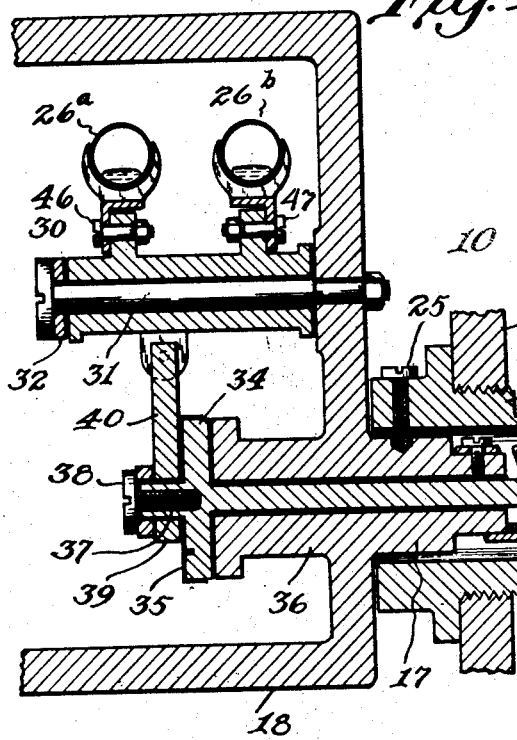
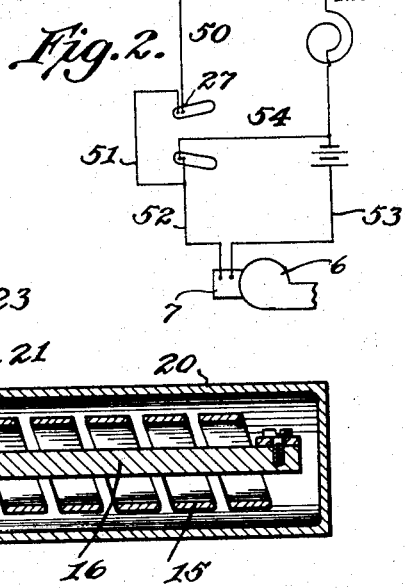
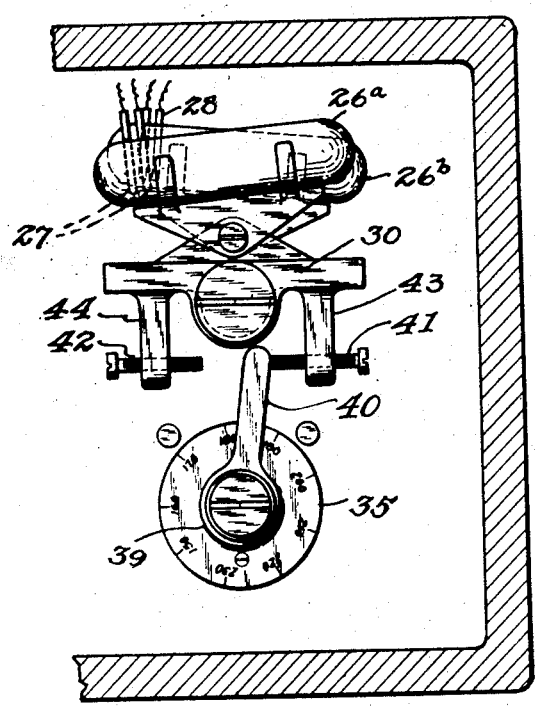
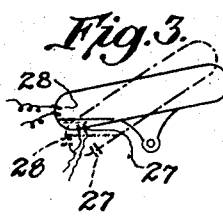
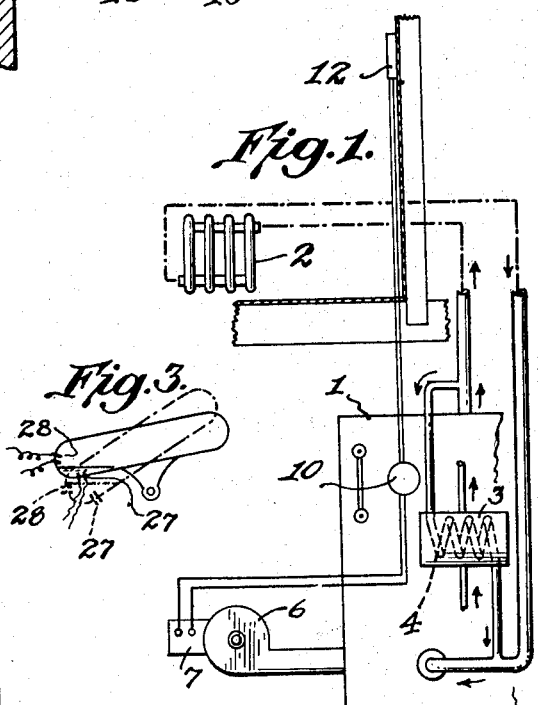
INVENTOR.
Earl R. Snavely
BY
Eugene C. Brown
ATTORNEY

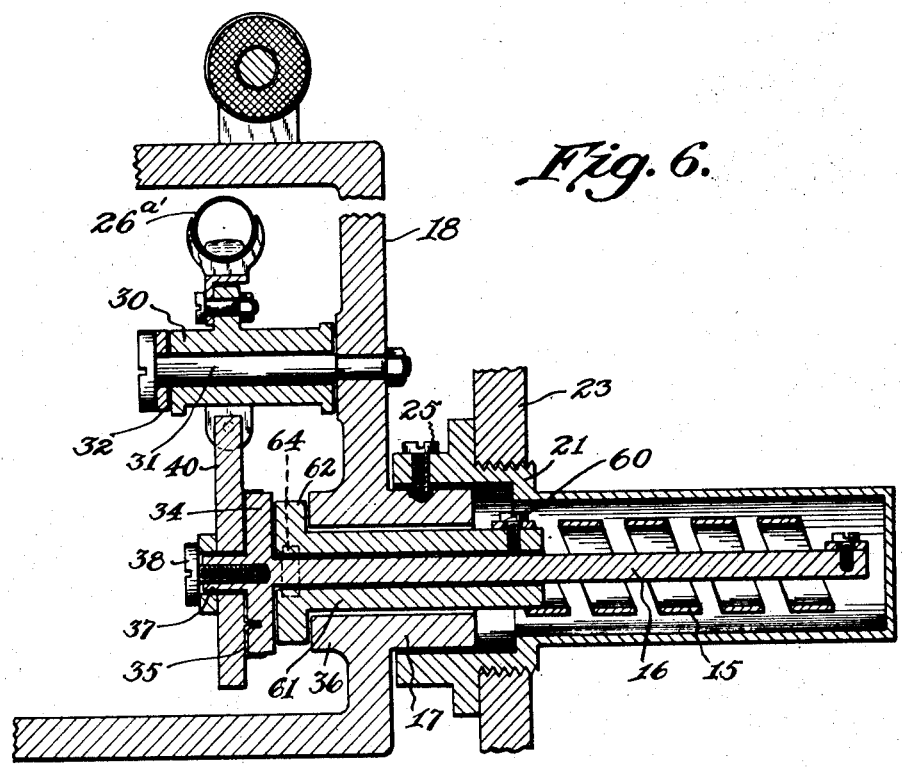
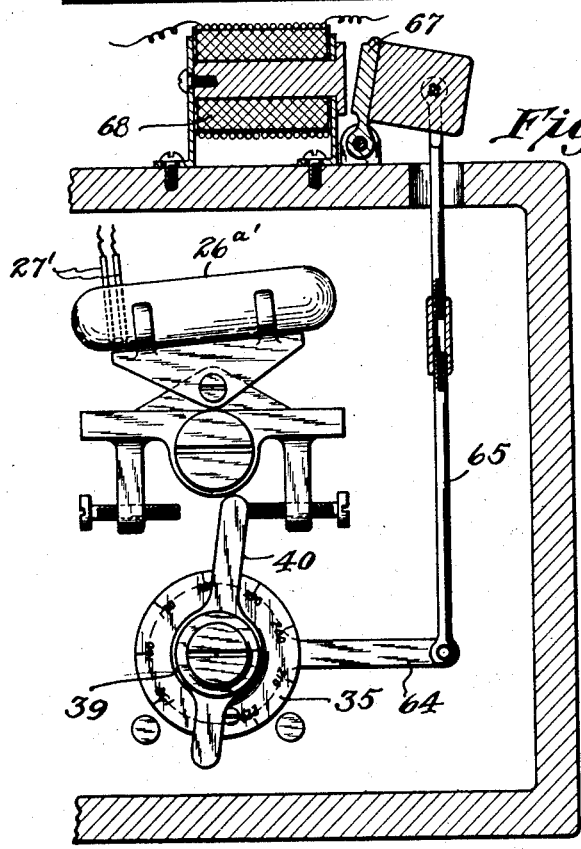
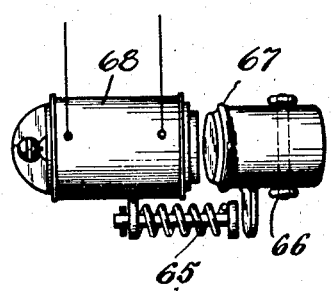

Patented Aug. 8, 1933

1,921,708

UNITED STATES PATENT OFFICE 1,921,708

COMBINED HOUSE HEATING AND DOMESTIC WATER HEATING SYSTEM

Earl R. Snavely, Union, N. J., assignor to Evelyn L. Snavely, Newark, N. J.

Application January 14, 1933. Serial No. 651,779

6 Claims. (Cl. 236—9)

This invention relates to thermostatically controlled heating systems.

In heating systems wherein the steam or other heating medium supplied to the radiators or house heating apparatus varies with the atmospheric temperature changes, there are periods of longer or shorter length when no heat is demanded and yet it is desirable to maintain the boiler at a certain predetermined minimum temperature rather than allow it to become quite cold. There are many conditions where this is desirable. Thus in greenhouses it is important that heat should be supplied quickly at times when a sudden atmospheric change causes the temperature to fall rapidly. A delay such as would be required to heat nearly cold water to steaming temperature might endanger the plants, whereas if the temperature of the boiler is maintained during idle heating periods at a point just below the steaming point, heat could be supplied upon demand very promptly.

It has long been the common practice in heating systems to obtain a supply of hot water for various purposes by means of a heat exchange unit consisting of a small tank in circuit with the water system having a coil of copper tubing within the tank which is connected to the steam supply of the heating system. In factories or industrial plants it is desirable that the hot water supply should be maintained in drying and curing rooms etc. over week-ends and during night hours when the factory is idle. Likewise it is desirable in private homes to have hot water at all times in the bathroom and for domestic purposes. Now by maintaining a predetermined minimum temperature in the boiler during all periods when no heat is required in the heating system so that heat may be supplied without delay when there is a demand for heat in the rooms, the function of maintaining a constant supply of hot water for domestic and other purposes is automatically accomplished.

Various means have been employed to control the boiler temperature under the different conditions. In some systems the control is effected by a thermostatic valve connected with the heat exchange unit. Thus in Patent 921,604, a greater demand is placed upon the heating plant when the fire engines are connected to the boiler than at times when the boiler is merely required to maintain the water in the heat exchange unit at the desired temperature for the hot water system. In other systems a room thermostat controls the supply of heating medium delivered to the radiators and a separate thermostat which responds to the heating medium flowing both to the house heating devices and to the heat exchanger for the domestic water supply, governs the burner or fuel supply to the boiler, as in Patent 1,533,630. Other heating systems have employed a hydrostat and a pressurestat on the boiler in conjunction with the room thermostat to regulate the temperatures and control the fuel supply, examples of which are shown in Patents 1,596,836 and 1,654,396.

The object of my invention is to simplify the temperature control system and reduce the number of operative elements required, thereby contributing to greater stability and reducing the cost of manufacture and cost of installation.

In the following description I shall refer to the accompanying drawings in which—

Figure 1 is a schematic diagram showing the general arrangement of a combined house heating and domestic water heating system to which my heat control arrangement may be applied.

Figure 2 is a diagram illustrating a circuit connection which may be employed in my heat control system;

Figure 3 illustrates a mercury switch tube having a plurality of pairs of switch contacts;

Figures 4 and 5 are vertical section and end elevation views respectively of one form of my thermostatic switch device;

Figures 6 and 7 are vertical section and end elevation views respectively of another form of my thermostatic switch; and Figure 8 is a detail top plan view of the electro-magnetic shifting lever employed in the device shown in Figs. 6 and 7.

I have illustrated in Figure 1 a conventional schematic diagram of a house heating system connected in the usual manner through a heat exchanger to the domestic water heating system to which my control system is adapted. 1 represents the usual heating boiler or furnace supplying the heating medium to the radiators or house heating apparatus 2. The domestic water system is connected as indicated to the inlet and outlet pipes of the heat exchange unit 3, which is heated in the usual manner by a copper coil 4 through which the steam or house heating medium circulates.

The boiler may be heated by any suitable heat supply, such as a fuel oil or gas burner which is ordinarily provided with a motor driven blower, as indicated at 6, having an electrically operated control mechanism indicated at 7. When the boiler is heated by coal the control mechanism actuates the draft and flue dampers in the manner well understood.

In my heating system I employ only one boiler control switch device 10 in conjunction with the room thermostat 12. During the cool or winter season when the atmospheric conditions require heat to be supplied to the house heating radiators, the fuel supply and blower motor are controlled by the room thermostat 12, the boiler control switch device 10 remaining in the intermediate or normal position, indicated in Fig. 5, and in full lines in Fig. 3. Under these conditions the control mechanism 7 maintains the fuel supply to the burner and the blower in operation when the thermostat is closed and responds to the opening of the thermostat contacts by shutting off the fuel and stopping the motor. If the water in the boiler exceeds the maximum predetermined temperature the switch mechanism 10 moves into a position to open the circuit through the switch contacts, thereby cutting off the fuel supply to the burner.

As soon as the fuel is withdrawn, the boiler, of course, begins to cool and in case there should be no demand for further heat by the house thermostat 12, for a considerable period, the temperature of the water in the boiler would drop below the desired minimum temperature. Under these conditions my boiler thermo-control switch device 10 moves toward its minimum temperature position in which it assumes control through a second pair of contacts and closes the circuit through the electro-magnetic control mechanism 7 to operate the fuel feed and blower.

During this period of minimum predetermined boiler operation, if the temperature of the water in the boiler exceeds the predetermined boiler temperature for this lower operation, the thermo-control device 10 moves back in the opposite direction into intermediate position, thereby opening the circuit of the fuel feed and blower through said second pair of contacts, thus cutting off the burner. When the temperature of the water in the boiler drops down to the minimum predetermined temperature, the thermo-control switch device 10 moves back to the previous minimum position, thereby placing the fuel feed and blower under the control of the device 10 and thus maintaining said minimum position, thereby placing the fuel feed and blower under the control of the device 10 and thus maintaining said minimum temperature. If, however, during this period of minimum temperature operation of the boiler, the room thermostat closes its contacts, the circuit will be closed through the first pair of switch contacts, thus causing the burner to operate the boiler at the higher predetermined temperature range. This cycle of operations will continue indefinitely, thus automatically controlling the temperature of both the house heating system and the temperature of the water in the boiler during the period when there is no demand for heat by the room thermostat.

The thermo-control switch device 10, which is operated by the changes in the temperature of the water in the boiler, may be any suitable type. In Figs. 4 and 5 I have shown a switch of the usual mercury type wherein the contacts project into a tiltable tube containing a small amount of mercury, the contacts being closed by the mercury when the tube is tilted in one direction. I employ two pairs of contacts which may be carried by separate tubes as shown in Figs. 4 and 5 or they may be carried by the same tube as shown in Fig. 3, the pairs being so positioned relatively that in one position of the tube or tubes, only one pair of contacts will be bridged or connected by the mercury and in another position both pairs will dip into the mercury.

In the arrangement shown in Figs. 4 and 5 the boiler control thermostatic switch comprises a thermostatic element consisting of a helical coil 15 of bimetallic metal having its inner end secured to a spindle 16 and its outer end fixed to a boss 17 projecting from a casing 18 which encloses the electric switching mechanism. The coil is enclosed in a tubular member 20 closed at its inner end, which projects into the boiler, the outer end of the tube being provided with a flanged bushing 21, threaded externally to screw into a threaded aperture in wall 23 of the boiler, the bore of the bushing fitting over the boss 17 and being secured by a set screw 25.

The mercury tubes 26$^a$, 26$^b$ which carry the pairs of switch contacts 27 and 28 are mounted on a bracket 30 rotatable on a supporting bolt 31, being clamped between a friction washer 32 and the inner wall of the casing in a manner to permit tilting movement while frictionally held in any set position.

The outer end of the spindle 16 is provided with a flanged head 34 forming a disk to which is secured a plate 35 having graduations indicating the boiler temperatures required to produce the torsional movements of the thermostat spindle for different adjustments. The inner face of the disk 34 abuts the end of a boss 36 projecting from the inner wall of the casing in alinement with the boss 17, provided with a bore through which the spindle 16 extends. The outer end of the spindle terminates in a hollow interiorly threaded boss 37 which receives a clamping screw 38 to adjustably secure a collar 39 from which projects an arm 40 adapted to oscillate between adjusting screws 41, 42 carried by lugs 43, 44 depending from the switch-carrying bracket 30.

The operation of the heat control system will be evident to engineers and those familiar with automatic heating systems. The clamping screw 38 is first loosened and the arm 40 is moved to register with the graduation on the plate 35 corresponding with the desired boiler temperature when heat is supplied to the house heating apparatus. By loosening the screw 46 the tube 26$^a$ is tilted until the contacts 27 are immersed in the mercury when the boiler is at the predetermined temperature and arm 40 just touches the adjusting screw 41. The tube 26$^b$ is positioned so that it tilts slightly in the direction opposite to that of tube 26$^a$, causing the mercury to be in the opposite end from the contacts 28.

The electrical circuits are indicated in Fig. 2. When the room thermostat 12 closes its contacts a circuit is completed through conductor 50, switch contacts 27, conductor 51, conductor 52, electro-magnetic fuel and blower control mechanism 7, conductor 53 to the room thermostat. As soon as the room temperature reaches the predetermined maximum the thermostat contacts separate, opening the circuit and shutting off the fuel supply. If the room cools within a short time this operation will be repeated. In mild weather the room thermostat may remain open for a long period, so that sufficient time elapses to permit the boiler to cool below the temperature required to maintain the coil 3 in the heat exchange unit 4 at the right temperature to properly heat the domestic water system. As the water in the boiler cools, the boiler thermostat 15 moves the arm 40 in a clockwise direction which tilts the switch tubes, lowering the contact ends until the contacts 28 are immersed in the mercury of tube 26$^b$. This closes a circuit for the fuel supply mechanism through the conductor 54, thereby firing the boiler, which will now operate the boiler between the lower temperature limits determined by the tilting movements of the switch contacts 28. If the room thermostat closes, it immediately assumes the dominating control and operates the boiler between the higher temperature limits determined by the tilting movements of the contacts 27.

It is evident, of course, that during either operating period, if for any reason the temperature of the boiler should exceed the maximum predetermined temperature, the boiler thermostat element 15 will move the arm 40 in an anti-clockwise direction to raise the contacts and cause the mercury to move to the opposite end of the tubes, thereby shutting off the fuel supply.

As previously pointed out the two pairs of switch contacts may be carried by a single tube in the manner indicated in Fig. 3. It will also be obvious to engineers that it is not necessary to use a mercury type of switch shown herein for the purpose of illustration, as other mechanical types may be employed.

I have shown a modification in Figs. 6 and 7 wherein the fuel supply is under the control of a switch device having a single pair of contacts. The room thermostat merely serves to determine whether the switch device shall operate within a lower range or a higher range of boiler temperatures. The outer end of the helical thermostatic coil 15 is secured by a screw 60 to a sleeve 61 having an annular flange 62. An arm 64 projecting from or secured to the flange 62 is pivotally connected by a link 65 to the armature 67 of the electromagnet 68. The room thermostat closes a circuit which includes the coil of magnet 68, causing its armature to lift the arm 64, thereby moving the flange 62 and sleeve 61 around in anti-clockwise direction. The position of the fixed end of the helical thermostat coil 15 secured by the screw 60 is thus shifted, thereby changing the relation of the arm 40 to the elements of the tilting switch member, since the arm 40 and graduated disk 35 are connected with the free inner end of the helical coil 15 through the spindle 16. The effect of this shifting of the fixed end of the helical thermostat coil is to raise the point at which the thermostat will tilt the switch to break the circuit to the fuel control to a higher boiler temperature. When the room thermostat opens the circuit of the magnet, the spring 66 retracts the armature and causes the arm 64 to move the sleeve 61 in a clockwise direction thereby shifting the position of the fixed outer end of the helical thermostat coil so that the mercury switch will tilt to break the circuit and cut off the fuel supply at a lower predetermined boiler temperature. In this manner the boiler operates at a higher temperature when the room thermostat closes a circuit to energize the magnet 68 and at a lower boiler temperature when the contacts of the room thermostat are open.

It is evident, therefore, that the device shown in Figs. 6 and 7, operates to control the combined house heating system in a manner similar to the arrangement shown in Figs. 4 and 5.

It is apparent from the above description that my invention provides a single operative switch mechanism or unitary operative device, which is automatically shifted from one position to another to cause the boiler to operate at one temperature when heat is required for the house heating system and to operate at a reduced temperature during the periods when no heat is supplied to the house heating apparatus. My invention, therefore, greatly simplifies prior automatic control of house heating systems which necessitated a plurality of boiler control devices that were brought into operation at different times depending upon varying conditions.

Furthermore I have disclosed herein a system wherein the temperature range of heat control may be readily adjusted to operate at a different range to suit different conditions and the range for the minimum predetermined boiler temperature may be altered (as by changing the normal inclination of the switch tube 26$^b$) while the temperature controlled by the house heating thermostat remains as previously set. Other advantages of my system over prior heating systems will be apparent to heating engineers.

I claim:—

1. In an automatic control system for heaters, a heating boiler, a burner for supplying heat thereto, a house heating system connected to said boiler, a single unitary thermostatic boiler control instrument automatically movable to different positions in response to boiler temperatures and operative in one position to maintain the boiler at a temperature to supply heat to the house heating system and operative upon further movement in the same direction to another position to maintain the boiler at a temperature below that required for the house heating system.

2. In an automatic control system for heaters, a heating boiler, a burner for supplying heat thereto, a house heating system and a domestic water supply system operatively connected to said boiler, and a thermostatic device automatically movable to different positions responsive to boiler temperatures and operative in one position to cause said burner to maintain the boiler at a temperature for supplying heat to the house heating system and operative upon further movement in the same direction to another position to maintain the boiler at a temperature below that required for the house heating system.

3. In an automatic control system for heaters, a heating boiler, means for firing the boiler, a room heating system operatively connected to said boiler, an electromagnetic control mechanism for said firing means including a control circuit therefor, a thermostatic device connected to said circuit and automatically movable to different positions responsive to boiler temperatures, said device remaining in one position to maintain the boiler at a temperature to supply heat to the house heating system when the room thermostat calls for heat and moving to another position when the room thermostat has been satisfied to automatically maintain the boiler at a lower temperature.

4. In a heating system, a thermostatic boiler control device responsive to changes in boiler temperature and adjustable means for causing it to respond to different predetermined temperatures, and a plurality of electric switches operative in sequence by a progressive movement of said device to maintain the boiler at the different predetermined temperature settings.

5. In a heating system, a boiler control device having an element responsive to changes in boiler temperature, adjustable means for causing said device to operate at a plurality of predetermined temperatures, and means to automatically change the control from one predetermined setting to another predetermined setting in response to changes in temperature at a distant point.

6. In a heating system, a thermostatic boiler control device automatically movable progressively to different positions in response to changes in boiler temperature, said device being moved to one position at one predetermined temperature and to a different position at another predetermined temperature, an electromagnetic fuel control device, a plurality of sets of switch contacts carried by said device for controlling electric circuits connected in parallel to said electromagnetic fuel control device, one set being operative at one position of said device and another set being operative at another position of said device.

EARL R. SNAVELY.